H. K. JONES.
Machines for Stamping Carpenters' Squares.
No. 6,111. Reissued Nov. 3, 1874.
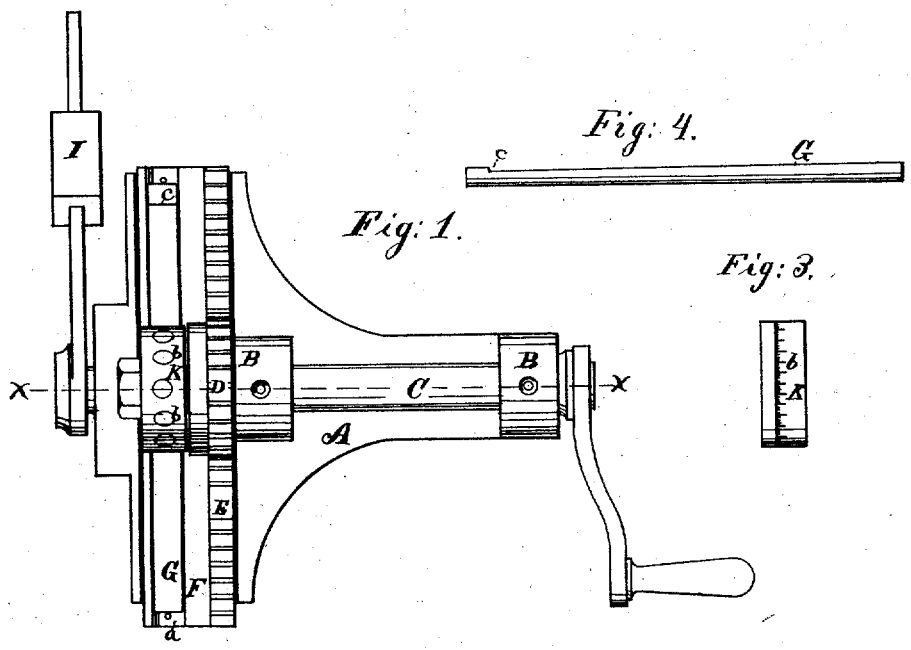
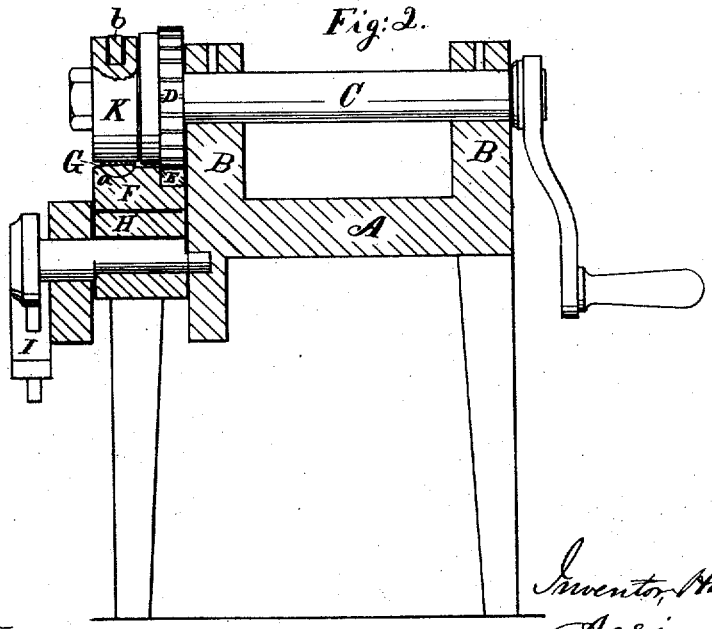
Inventor, Horace K. Jones
Assignee-
Hart Bliven & Mead Mfg. Co.
By James Shepard Atty.
Witnesses
Geo. A. Gourdy
Eunice Bartholomew
THE GRAPHIC CO. PHOTO-LITH. 39 & 41 PARK PLACE, N.Y.

UNITED STATES PATENT OFFICE.

HORACE K. JONES, OF KENSINGTON, CONNECTICUT, ASSIGNOR TO THE HART, BLIVEN & MEAD MANUFACTURING COMPANY, (LATE THE HART MANUFACTURING COMPANY.)

IMPROVEMENT IN MACHINES FOR STAMPING CARPENTERS' SQUARES.

Specification forming part of Letters Patent No. 41,742, dated February 23, 1864; reissue No. 6,111, dated November 3, 1874; application filed October 1, 1874.

*To all whom it may concern:*

Be it known that H. K. JONES, of Kensington, in the county of Hartford and State of Connecticut, has invented a new and useful Improvement in Machines for Stamping Carpenters' Squares, the following being a full, clear, and exact description of the same, reference being had to the accompanying drawings forming a part of this specification, in which—

Figure 1 represents a plan or top view of the machine which embodies said invention. Fig. 2 is a longitudinal vertical section of the same, the line *x x* of Fig. 1 indicating the plane of section, and Fig. 3 is a detached elevation of one of the stamping-rollers, and Fig. 4 is a detached elevation of the rolling-bed.

Similar letters in the several views indicate corresponding parts.

This invention consists in the employment of a roller provided with a series of dies representing the figures or graduations, or both, for one side of one arm of the square to be stamped, in combination with a rolling or rocking bed, which compensates for the varying thickness transversely to the arms of the squares, and with a yielding bed which compensates for the inequalities in the length of the arms of the squares.

A represents a frame of any suitable material, and provided with two standards, B, which form the bearings for the driving-shaft C. This shaft is rotated by any competent power, and it carries a cog-wheel, D, which gears into a toothed rack, E, on the side of the traveling-bed F. This bed F is made of any suitable material, and it moves between suitable ways in the frame A. The face or surface of this bed F is provided with a semicircular cavity, *a*, to receive the supplementary and rocking bed G. This bed G is made in the form of a semi-cylinder, its convex side being placed in the cavity *a*, and it projects slightly above the surface of the traveling-bed F, so that a square or other article placed on it can readily adjust itself in a lateral or transverse direction. *c* represents a shoulder formed on the face of the bed G, which answers for a gage against which one end of the blade of the square rests during the operation of stamping. For square blades that are thicker at one end than at the other, the surface of this bed is inclined longitudinally, the lowest point being at the shoulder *c*, as shown in Fig. 4, so that when the blade to be stamped is placed upon this bed the upper surface of the blade will be parallel to its plane of motion. Instead of placing the supplemental and rocking bed G in a cavity, it might be hung on centers so as to enable it to have a rocking motion, and be able to adjust itself according to the shape of the article to be stamped. This adjustment is of peculiar value for stamping carpenters' squares which are oftentimes thinner on one edge than on the other. The traveling-bed F is also a yielding bed, and is acted upon by the cam H, which is subjected to the action of an adjustable weight, I, or, instead of this weight, a spring may be applied. By this weight the cam is pressed up against the under surface of the bed F, which is forced up against the stamping-rolls K, thus keeping the article to be stamped in close contact with the surface of the roller-frame from one end to the other, and at the same time allowing the traveling-bed to yield so that any irregularities in the surface of the square or other articles to be stamped are thus compensated, and the action of the stamping-roller is rendered uniform throughout. The stamping-roller K is secured to the end of the shaft C, and it is provided with dies *b*, representing the figure or the graduation to be produced on the squares or other articles to be stamped. The figures and the graduations may, however, be inserted in or produced on the surface of one and the same roller, and the dies may either be made movable or solid with the rollers.

By having the dies on the cylindrical surface of the rollers, each die presses the square, or other article to be stamped, flat down upon the bed, and there is much less tendency on the part of the square to bend than there would be in case the dies were placed on the bed, and the square pressed thereon by means of a pressure-roller.

By this machine the operation of stamping and graduating carpenters' squares can be accomplished with very little labor in a short time, and perfectly reliable.

What is claimed as new, and desired to be secured by Letters Patent, is—

1. The combination of the die-roller K, and rolling-bed G, substantially as and for the purpose described.

2. The combination of the die-roller K and yielding bed F, substantially as and for the purpose described.

3. The combination of the die-roller K, rocking-bed G, and traveling-bed F, substantially as and for the purpose described.

4. The series of dies upon the face of the roller K, representing all the figures for one side of one arm of a square, in combination with a yielding traveling-bed, substantially as described.

HART, BLIVEN & MEAD MFG. CO.,

By I. T. HART, *Vice-President.*

Witnesses:

THERON UPSON,

SAMUEL NEWALL.